(12) United States Patent
Tatsumi

(10) Patent No.: US 7,484,283 B2
(45) Date of Patent: Feb. 3, 2009

(54) CIRCULAR WORKPIECE SEPARATION DEVICE

(75) Inventor: Riyuuichi Tatsumi, Kumamoto (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/575,619

(22) PCT Filed: Aug. 19, 2005

(86) PCT No.: PCT/JP2005/015166

§ 371 (c)(1),
(2), (4) Date: Mar. 26, 2007

(87) PCT Pub. No.: WO2006/033212

PCT Pub. Date: Mar. 30, 2006

(65) Prior Publication Data

US 2007/0231115 A1  Oct. 4, 2007

(30) Foreign Application Priority Data

Sep. 21, 2004  (JP) .............................. 2004-274033

(51) Int. Cl.
*B23P 19/04* (2006.01)
(52) U.S. Cl. ...................................................... 29/239
(58) Field of Classification Search .................. 29/239, 29/229, 809, 426.6; 254/28, 104; 83/425.3, 83/932; 30/109–113
See application file for complete search history.

(56) References Cited

U.S. PATENT DOCUMENTS 2,166,444 A * 7/1939 Kinninger et al. ............ 254/104
2,480,037 A * 8/1949 Luckins ......................... 29/229
4,188,755 A * 2/1980 Fitzpatrick ................... 451/547
4,473,220 A * 9/1984 Hovens et al. ................. 254/28
5,301,407 A * 4/1994 Koenig ......................... 29/229
5,471,746 A * 12/1995 Agrimis ..................... 30/123.5
6,076,260 A * 6/2000 Williamson, IV ............. 30/113
2003/0051590 A1 * 3/2003 Kaplan ......................... 83/167

FOREIGN PATENT DOCUMENTS

| JP | 2-97529 | 8/1990 |
|---|---|---|
| JP | 09-135099 | 5/1997 |
| JP | 09-225754 | 9/1997 |
| JP | 2002-331469 | 11/2002 |
| JP | 2003-175425 | 6/2003 |

* cited by examiner

*Primary Examiner*—Robert C Watson
(74) *Attorney, Agent, or Firm*—Rankin, Hill & Clark LLP

(57) ABSTRACT

When a separating plate 9 is lowered by the actuation of a cylinder unit 11 from the condition in which the far right C-shaped clip W of a group of C-shaped clips W touches a step section 15 of the separating plate 9 and stops, a wedge section 16 is driven between the far right C-shaped clip W and the subsequent C-shaped clip W to separate the far right C-shaped clip W to fall down on the right side. When the separating plate 9 is further lowered, the far right C-shaped clip W is completely separated. With this arrangement, a shaft section 101 of an installation jig 100 is positioned by a guide plate 8 and is inserted into the inner hole of the guide rod 3 to hold down part of the C-shaped clip W separated between the front shaft section 101 and a clamp member 103 for separation.

4 Claims, 6 Drawing Sheets

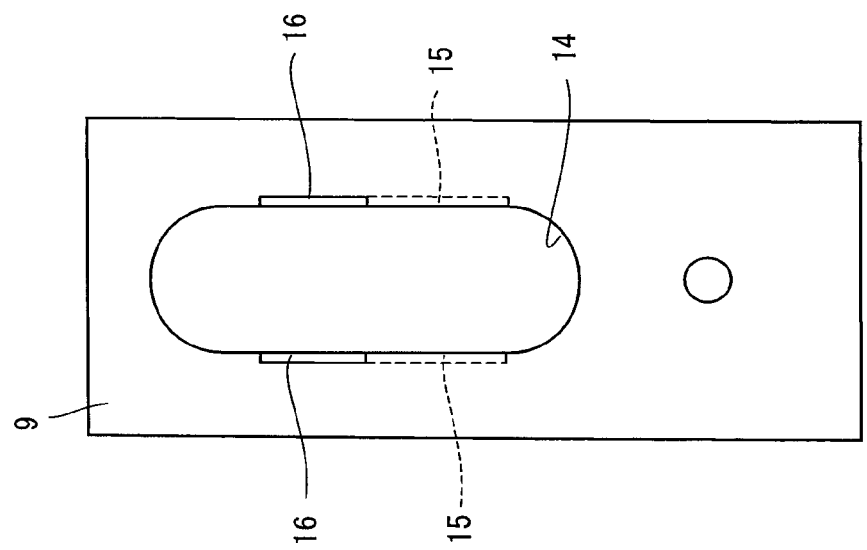
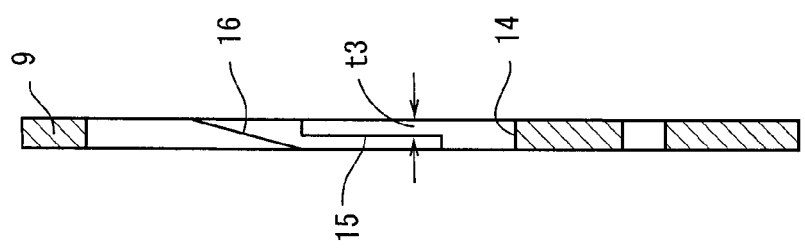
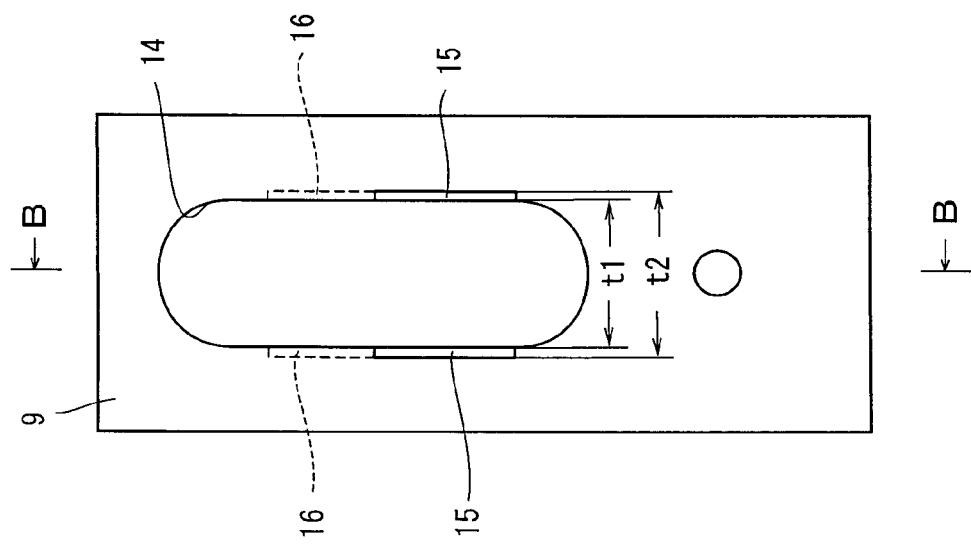

CIRCULAR WORKPIECE SEPARATION DEVICE

TECHNICAL FIELD

The present invention relates to a device for separating circular workpieces such as C-shaped clips, one by one.

BACKGROUND ART

To prevent a piston pin attached to a piston from coming off, a C-shaped clip is fitted into an annular groove of a hole into which the piston pin is installed. A device for automatically conducting such a C-shaped clip fitting operation is proposed in Patent Document 1. The device comprises an ejecting cylinder, a positioning cylinder, and a fitting cylinder, wherein a C-shaped clip held within a holder is pushed slantwise in a cylindrical member in a reduced diameter condition by the ejecting cylinder, the cylindrical member is caused to come down by the positioning cylinder to touch a piston, and the clip is caused to engage the inside of an annular groove by the fitting cylinder.

Devices for separating workpieces other than the C-shaped clips one by one disclosed in Patent Documents 2 and 3 are also known.

The device disclosed in Patent Document 2 is provided in such a manner that a cylinder containing a workpiece is arranged slantwise, a spiral bar adapted to rotate by a motor is provided within the cylinder, and the workpieces are supplied one by one from an upper opening of the cylinder as the spiral bar rotates.

The device disclosed in Patent Document 3 is provided in such a manner that a slider is disposed slantwise, a stopper is disposed on the lower end of the slider, and workpieces slipping off the slider are separated one by one by the stopper.

[Patent Document 1] Japanese Patent Application Publication No. 9-225754

[Patent Document 2] Japanese Patent Application Publication No. 9-135099

[Patent Document 3] Japanese Patent Application Publication No. 2003-175425

A circular workpiece such as a C-shaped clip and a piston ring is usually narrow and thin. Further, oil and rust retardant are often attached to the workpiece. In the case of a cartridge and the like in which a number of circular workpieces are bundled, the circular workpieces cling to one another and separation of the workpieces by the devices stated above is quite difficult.

DISCLOSURE OF THE INVENTION

It is therefore an object of the present invention to provide an improved circular workpiece separation device which can solve the problems stated above.

In order to attain this object, according to the present invention, a circular workpiece separation device comprising a guide rod of which the outer periphery is slidably provided with a number of circular workpieces and a separating plate provided with an opening through which one end of the guide rod is passed is provided, in which the circular workpieces are spring-biased toward the separating plate along the guide rod by a biasing means, the separating plate is caused to reciprocate in the diametrical direction of the guide rod by a driving means, the width dimension of the opening of the separating plate is larger than the outer diameter of the guide rod and is smaller than the outer diameter of the circular workpieces, wherein the inner periphery of the opening is provided with a wedge section which is driven between the foremost circular workpiece and the subsequent circular workpiece when the separating plate moves in the diametrical direction of the guide rod to separate the foremost workpiece.

With this arrangement, it is possible to surely separate the circular workpieces even though they cling to one another.

In order to allow the wedge section to surely enter between the foremost circular workpiece and the subsequent circular workpiece, the inner periphery of the opening is provided with a step section which touches the foremost circular workpiece and the step section is constructed with such a thickness as to situate the front end of the wedge section between the contacted circular workpiece and the subsequent circular workpiece.

Further, if the biasing means is a constant force spring, it is possible to smoothly feed the circular workpieces in the separating section from beginning to end.

BRIEF DESCRIPTION OF THE DRAWINGS

The above and other objects, features and advantages of the present invention will become more apparent from the following description when taken in conjunction with the accompanying drawings.

FIG. 3 is a front view of a separating plate forming part of the separation device;

FIG. 4 is a cross-sectional view taken along line B-B of FIG. 3;

FIG. 5 is a rear view of the separating plate forming part of the separation device;

BEST MODE FOR CARRYING OUT THE INVENTION

Figure 1:
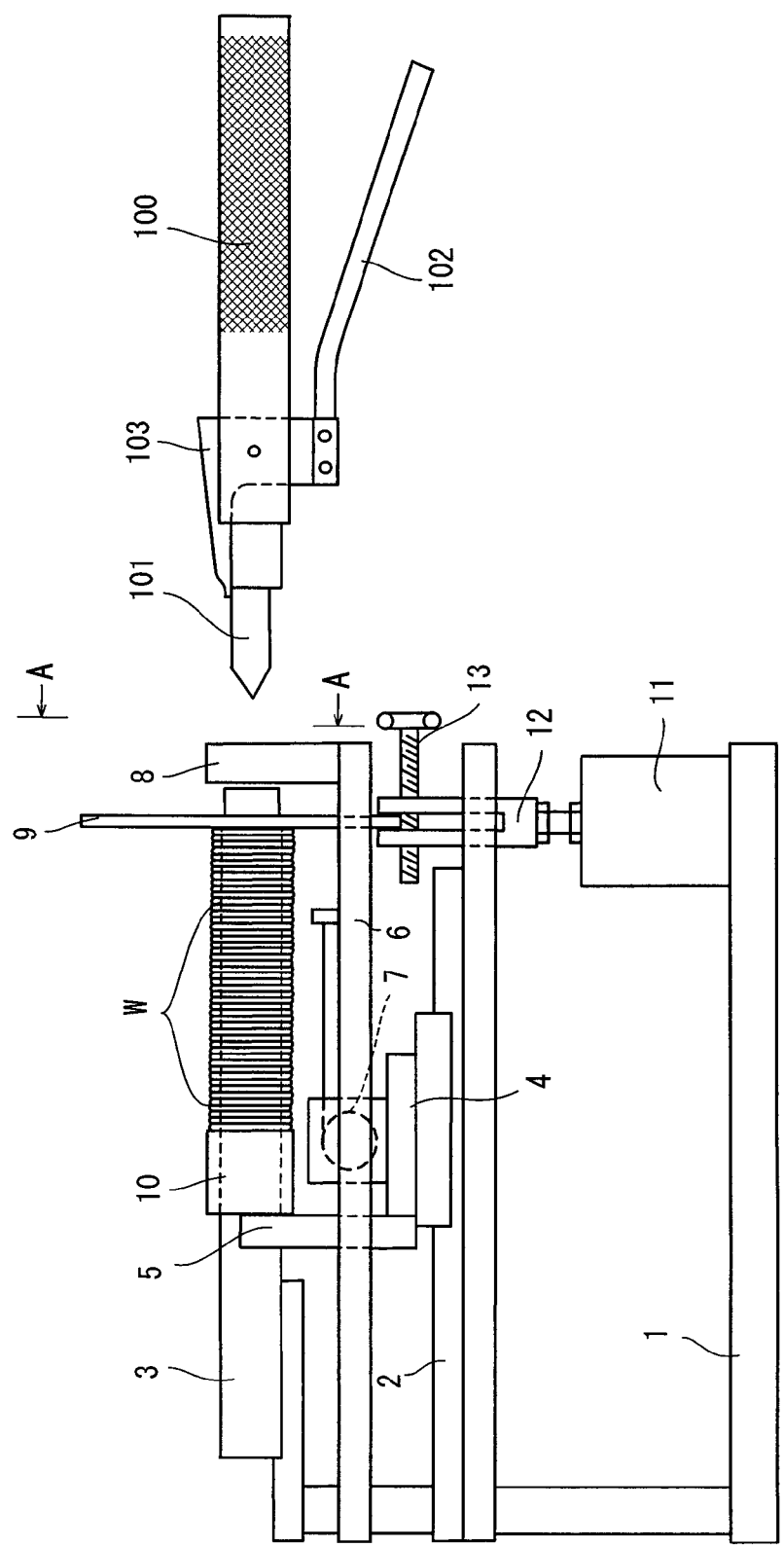
FIG. 1 is a front view of a circular workpiece separation device according to the present invention.
Figure 2:
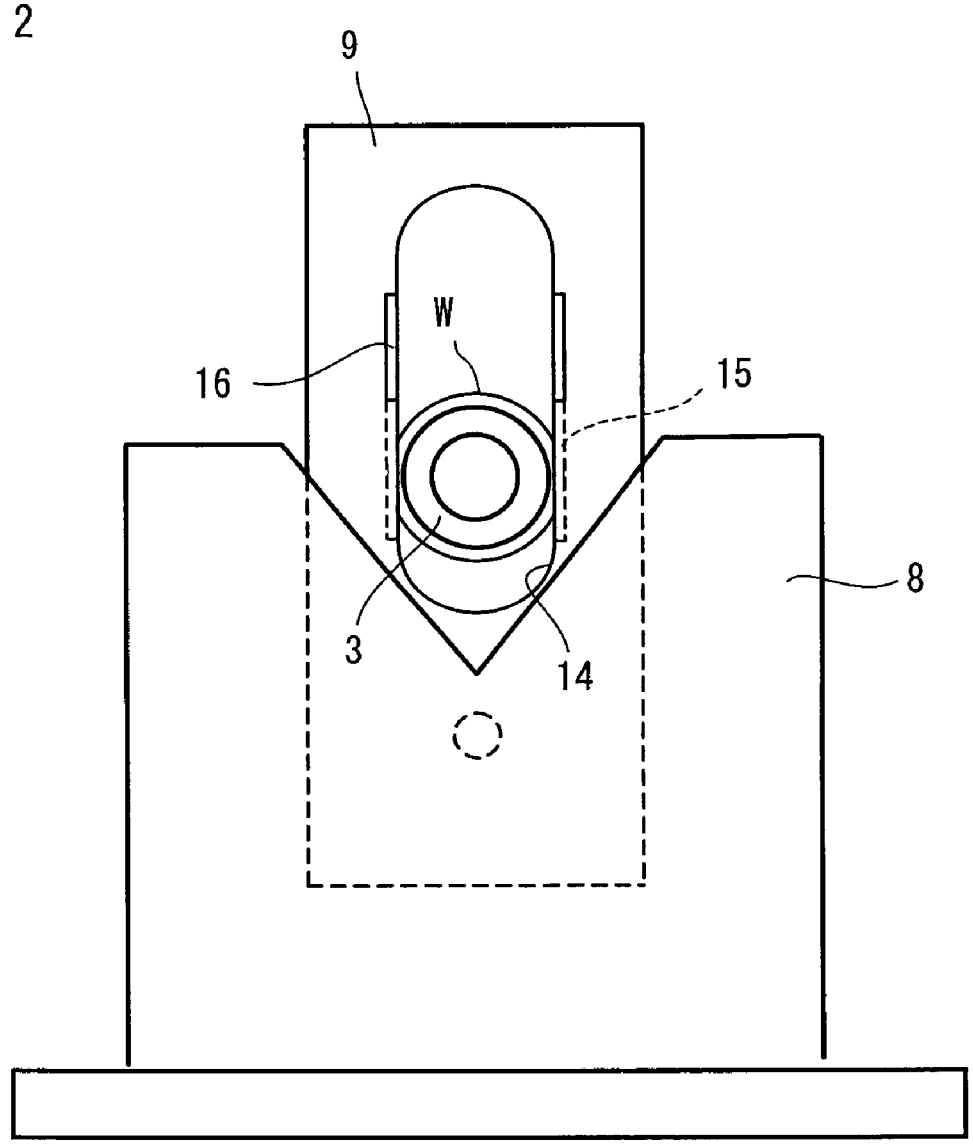
FIG. 2 is an enlarged side view of the circular workpiece separation device as seen from the direction of the arrow A in FIG. 1.

Preferred embodiments of the present invention will now be described with reference to the accompanying drawings. FIG. 1 is a front view of a circular workpiece separation device according to the present invention. FIG. 2 is an enlarged side view of the circular workpiece separation device taken in the direction of the arrow A of FIG. 1. FIG. 3 is a front view of a separating plate forming part of the separation device and FIG. 4 is a cross-sectional view taken along line B-B of FIG. 3. FIG. 5 is a rear view of the separating plate forming part of the separation device. In this embodiment, a circular workpiece is referred to as a C-shaped clip which is fitted into a piston pin installation hole for preventing the piston pin from falling off.

The separation device comprises a base 1, a rail 2 provided parallel to the base 1, and a guide rod 3 made of a pipe member provided above and parallel to the rail 2. The rail 2 is provided with a movable body 4 which has an erect piece 5 extending upward. Provided between the movable body 4 and a support plate 6 secured to the base 1 is a constant force spring 7 which spring-biases the movable body 4 toward the right side of the figure at a constant force.

As shown in FIG. 2, a V-shaped guide plate 8 is secured to the front end of the support plate 6. A shaft section of an installation jig for the C-shaped clip is mounted on the guide plate 8 for alignment.

On the one hand, the front end (i.e., the right edge) of the guide rod 3 penetrates a separating plate 9 and a ring member 10 is slidably mounted on the outer periphery of the guide rod 3. The erect piece 5 of the movable body 4 touches the rear end (i.e., the left edge) of the ring member 10. As a result, the biasing force of the constant force spring 7 is applied to a group of C-shaped clips W through the movable body 4 and the ring member 10 to spring-bias the group of C-shaped clips W toward the right side of the figure, wherein the far right C-shaped clip W touches the separating plate 9 at a constant force.

The separating plate 9 is position-adjustably attached by a bolt 13 to a biforked connecting section 12 of a cylinder unit 11 which is securely fastened to the base 1. The separating plate 9 is adapted to vertically reciprocate by driving the cylinder unit 11.

As shown in FIGS. 3 through 5, the separating plate 9 is formed as a rectangle when seen from the front and is provided with an oval opening 14 at the center. The width dimension t1 of the opening 14 is set larger than the outer diameter of the guide rod 3 and is set smaller than the outer diameter of the C-shape clip W.

The rectilineal right and left sides of the inner periphery of the opening 14 are provided with a step section 15 and a wedge section 16. The outside distance t2 of the right and left step sections 15 and 15 in the width direction is set larger than the outer diameter of the C-shaped clip W. Likewise, the outside distance of the right and left wedge sections 16 and 16 in the width direction is also set to have the same distance t2 as above.

Further, as shown in FIG. 4, the thickness t3 of the step section 15 is set to have the dimension whereby the front end (i.e., the lower end) of the wedge section 16 is situated between the foremost C-shaped clip W and the subsequent C-shaped clip W in such a condition that the foremost C-shaped clip W touches the step section 15.

Figure 6:
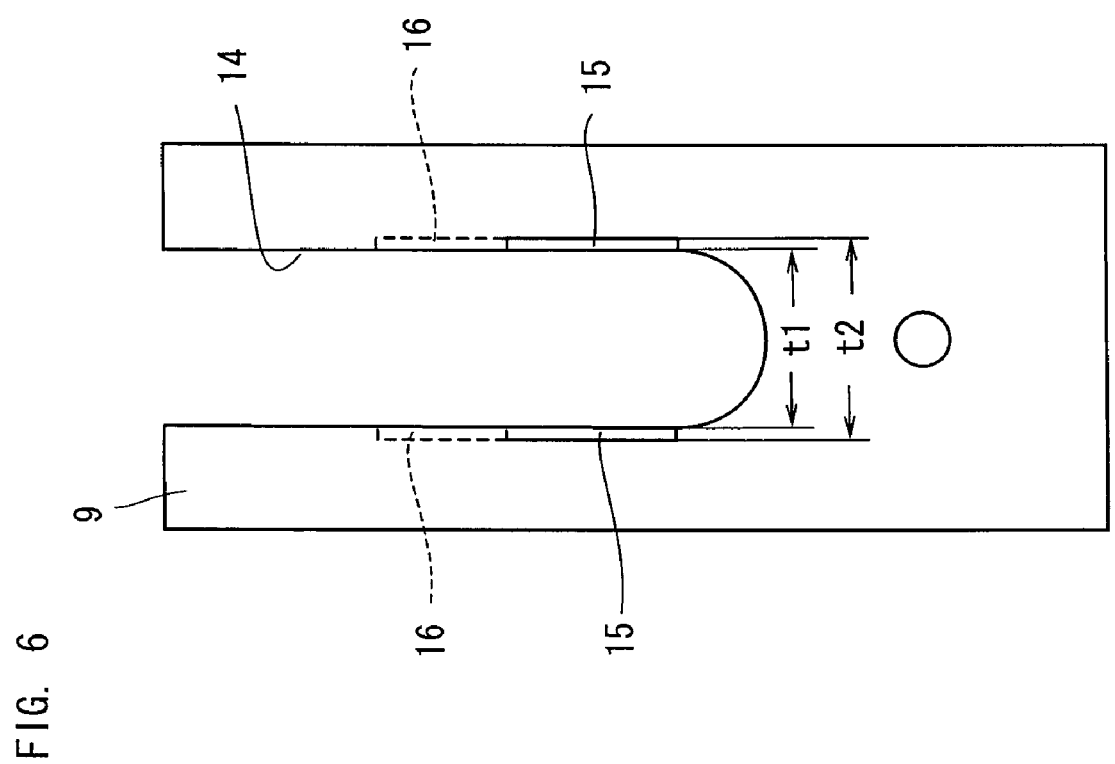
FIG. 6 is a view showing another embodiment of the separating plate.

FIG. 6 is a view showing another embodiment of the separating plate 9. In this embodiment, the opening 14 is not a closed oval shape, but an upward opening shape. The opening 14 can also be a downward opening shape.

Figure 7:
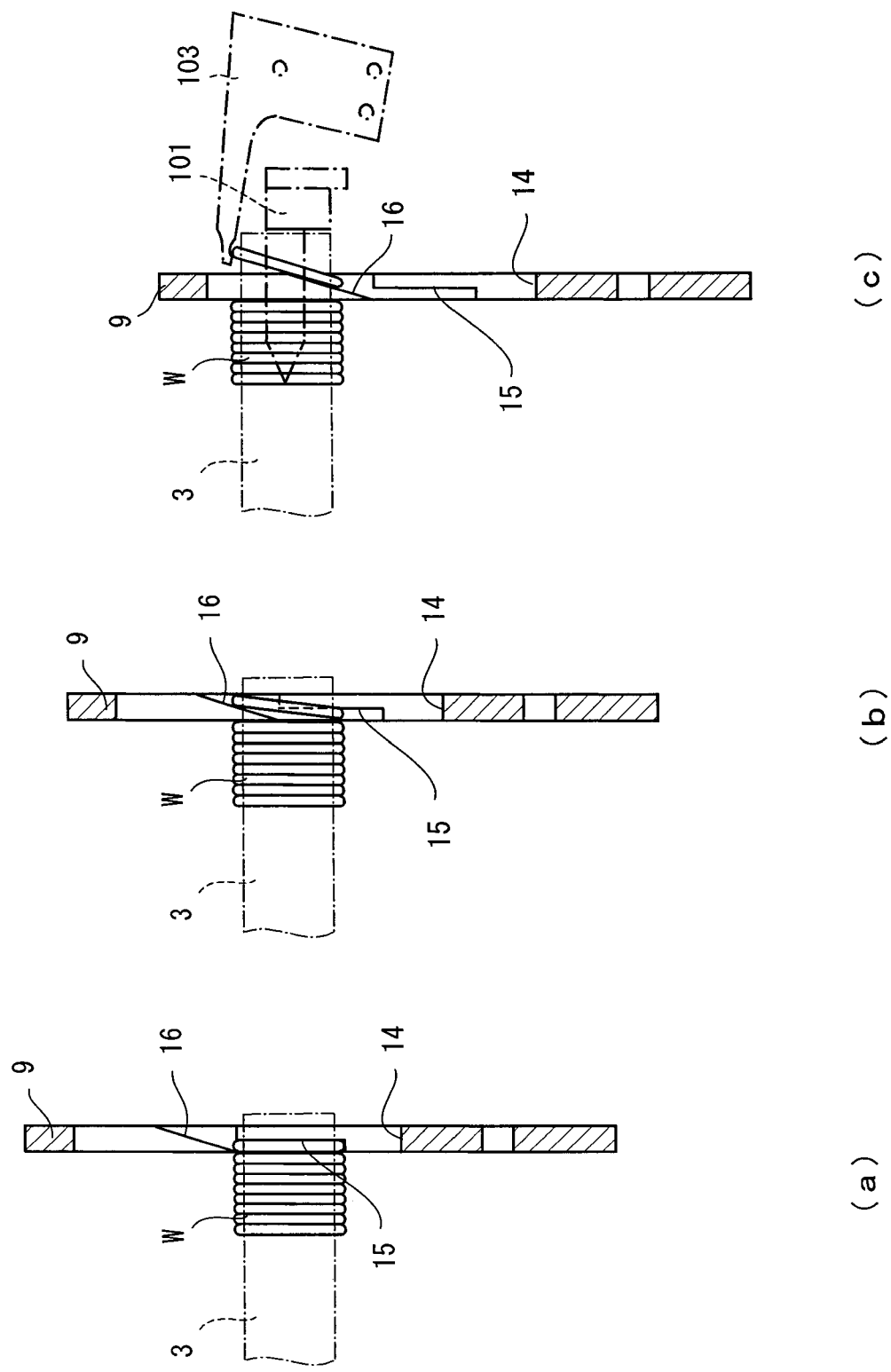
FIGS. 7 (*a*) through (*c*) are views explaining the operation of the separation device.

With this arrangement, FIG. 7(a) shows the condition in which the far right C-shaped clip W of a group of C-shaped clips W touches the step section 15 of the separating plate 9 and stops under the influence of a constant force spring 7. When the separating plate 9 is lowered from this condition by the actuation of the cylinder unit 11, the wedge section 16 is driven between the far right C-shaped clip W and the subsequent C-shaped clip W as shown in FIG. 7(b) and as a result, the upper section of the far right C-shaped clip W is separated to fall down on the right side. When the separating plate 9 is further lowered, the far right C-shaped clip W is completely separated as shown in FIG. 7(c).

In this condition, as shown in FIG. 1, a shaft section 101 which is the front end of an installation jig 100 is positioned by the guide plate 8 to be inserted into the inner hole of the guide rod 3. By operating a lever 102, part of the C-shaped clip W separated between the front shaft section 101 and a clamp member 103 is held down for separation.

Figure 8:
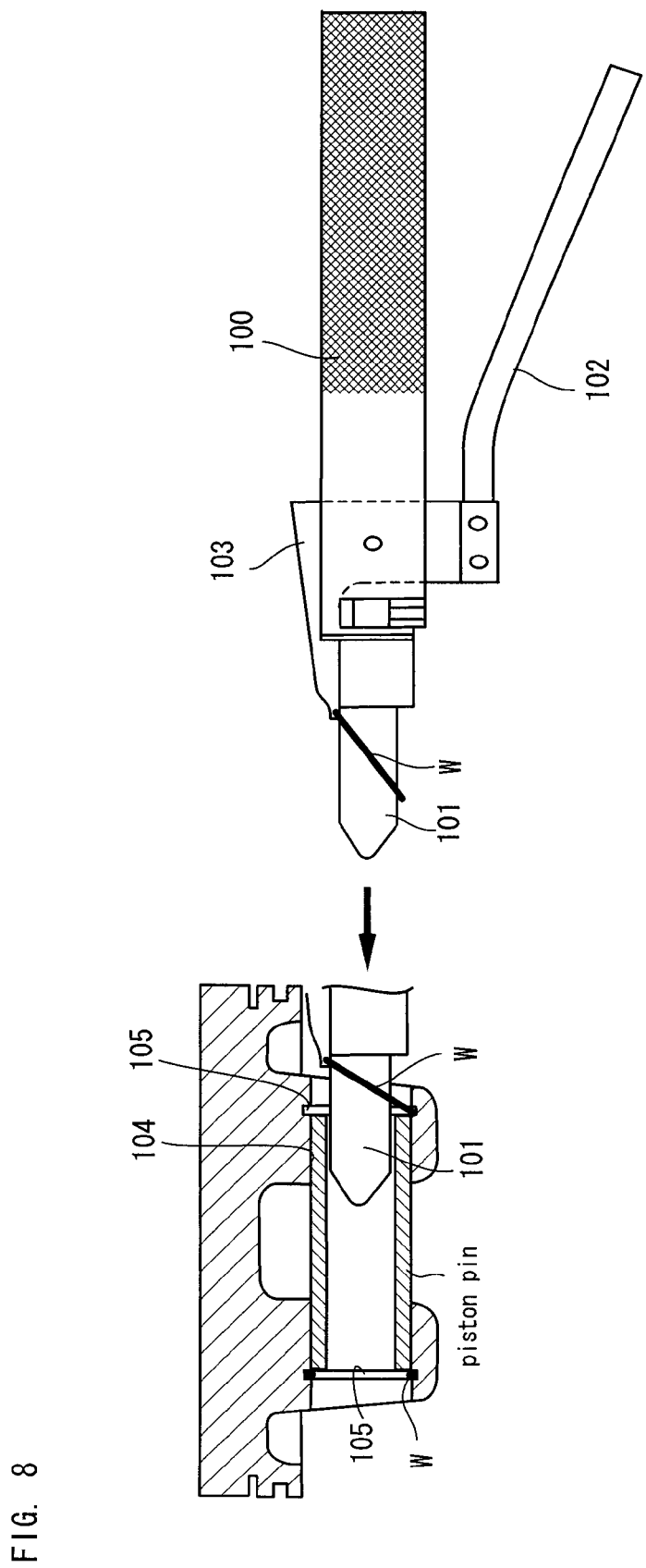
FIG. 8 is a view explaining the operation of an installation jig for a C-shaped clip serving as the circular workpiece.

Steps for installing the C-shaped clip W in an annular groove of a piston pin installation hole using the installation jig 100 in which the C-shaped clip W is set up are described with reference to FIG. 8. First, the C-shaped clip W is held slantwise between the front end of the clamp member 103 and the shaft section 101 so that the lower end of the C-shaped clip W moves forward.

Next, the shaft section 101 is inserted into a piston pin installation hole 104. In this case, the lower end of the C-shaped clip W is first fitted into an annular groove 105. If the shaft section 101 is further advanced releasing the lever 102 and then releasing the holding condition by the clamp member 103, the rest of the C-shaped clip W is pushed into the annular groove 105.

In the embodiments described above, it is shown that an operator manually holds the installation jig 100 to separate the C-shaped clips W, one by one, but it is also possible to have a device for setting the installation jig provided adjacent to the separation device to automatically set the C-shaped clip W on the installation jig 100.

A device for separating a circular workpiece according to the present invention can be used in a process for installing a C-shaped clip in an annular groove of a piston pin installation hole.

According to the present invention, the circular workpieces such as a number of C-shaped clips can be surely separated, one by one, from the laminated or connected condition. It is therefore possible to easily conduct the operation for allowing the workpiece installation jig and the like to hold the workpieces and to remarkably improve the working efficiency.

The invention claimed is:

1. A device for separating circular workpieces comprising:
 a guide rod whereby the circular workpieces are slidably situated on an outer periphery of the guide rod;
 a separating plate having an opening adapted to receive an end of the guide rod containing the workpieces, wherein the opening includes a first rectilinear side and a second rectilinear side, the separating plate comprising:
  a first step section located on a first portion of the first rectilinear side of the opening and a second step section located on a first portion of the second rectilinear side of the opening, wherein a distance between an inner edge of the first and second step sections is less than an outer diameter of the workpieces and a distance between an outer edge of the first and second step sections is larger than the outer diameter of the workpieces;
  a first wedge located on a second portion of the first rectilinear side of the opening, wherein the first wedge is spaced from the first step section such that a first angled opening is defined between the first wedge and the first step section along the first rectilinear side; and
  a second wedge located on a second portion of the second rectilinear side of the opening, wherein the second wedge is spaced from the second step section such that a second angled opening is defined between the second wedge and the second step section along the second rectilinear side;
 a driving means to reciprocally move the separating plate in a direction parallel to the first and second rectilinear sides; and a biasing means to slidably bias the workpieces on the guide rod toward the separating plate.

2. The device of claim 1, wherein the biasing means biases the workpieces such that a foremost workpiece contacts the first and second step sections, wherein a thickness of the first and second step sections is such that an edge adjacent to the first and second angled openings of the first and second wedges respectively is situated between the foremost workpiece and a subsequent workpiece.

3. The device of claim 2, wherein the driving means drives the separating plate vertically downward such that the first and second wedge sections separate an upper portion of the foremost workpiece and wherein, as the separating plate continues downwardly, the foremost workpiece separates from the subsequent workpiece and is displaced at an angle through the first and second angled openings.

4. The device of claim 3, wherein the biasing means is a constant force spring.

* * * * *